(12) United States Patent
Leskinen et al.

(10) Patent No.: US 8,017,704 B2
(45) Date of Patent: Sep. 13, 2011

(54) PROCESS FOR THE PRODUCTION OF PROPYLENE COPOLYMERS USING A PREPOLYMERISED CATALYST

(75) Inventors: Pauli Leskinen, Helsinki (FI); Olli Tuominen, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 12/663,110

(22) PCT Filed: Jun. 11, 2008

(86) PCT No.: PCT/EP2008/004687
§ 371 (c)(1),
(2), (4) Date: Dec. 4, 2009

(87) PCT Pub. No.: WO2008/151794
PCT Pub. Date: Dec. 18, 2008

(65) Prior Publication Data
US 2010/0184929 A1    Jul. 22, 2010

(30) Foreign Application Priority Data
Jun. 14, 2007 (EP) .................... 07011714

(51) Int. Cl.
*C08F 4/00* (2006.01)

(52) U.S. Cl. .................... 526/90; 526/904

(58) Field of Classification Search ............ 526/90
See application file for complete search history.

(56) References Cited

U.S. PATENT DOCUMENTS 5,153,158 A * 10/1992 Kioka et al. ............ 502/126
7,189,788 B2 * 3/2007 Machida et al. ............ 525/240

FOREIGN PATENT DOCUMENTS

| EP | 0435332 | 7/1991 |
| EP | 0808870 | 11/1997 |
| WO | 9858976 | 12/1998 |
| WO | 0026266 | 5/2000 |

* cited by examiner

*Primary Examiner* — David W Wu
*Assistant Examiner* — Sonya Wright
(74) *Attorney, Agent, or Firm* — Milbank, Tweed, Hadley & McCloy, LLP

(57) ABSTRACT

The present invention relates to a process for the production of propylene copolymers wherein in a first step an olefin polymerization catalyst comprising a solid catalyst component is subjected to a prepolymerization reaction in a prepolymerization reactor, in which propylene monomers are present in an amount of 98.0 to 99.9 mol % and further alpha-olefin monomers other than propylene are present in an amount of 0.1 to 2.0 mol %, based on the combined amount of propylene and further alpha-olefin monomers, so that a prepolymer is produced on the catalyst in an amount of 10 to 1000 g per g of the solid catalyst component, and in a second, subsequent step propylene and further alpha-olefin monomers other than propylene are copolymerized in the presence of the prepolymerized catalyst produced in the first step so that a propylene copolymer is obtained which contains at least 0.1 mol % of alpha-olefin units other than propylene, to propylene copolymers obtainable by such a process and to the use of a prepolymerized catalyst in such a process.

9 Claims, No Drawings

PROCESS FOR THE PRODUCTION OF PROPYLENE COPOLYMERS USING A PREPOLYMERISED CATALYST

This application is based on International Application PCT/EP2008/004687, filed on Jun. 11, 2008, which claims priority to European Patent Application No. 07011714.8, filed on Jun. 14, 2007, the disclosures of which are incorporated by reference herein in their entireties.

The present invention relates to process of producing propylene copolymers wherein propylene and further alpha-olefin monomers other than propylene are copolymerised in the presence of a prepolymerised catalyst produced in the first step so that a propylene copolymer is obtained which contains at least 0.1 mol % of alpha-olefin units other than propylene, to propylene copolymers obtainable by such a process and to the use of a prepolymerised catalyst in such a process.

It is known in the art to prepolymerise olefin polymerisation catalysts in order to improve the properties of the polyolefin particles obtained in the main polymerisation reaction.

For example, EP 435332 discloses a method where propylene is prepolymerised with ethylene on a catalyst so that the prepolymer contained from 2 to 30% by mole of ethylene units and from 70 to 98% by mole of propylene units and the amount of prepolymer was from 0.2 to 4000 g/g catalyst. However, in the examples of EP 435332 in the step following the preparation of the prepolymerised catalyst only propylene homopolymers are produced.

It is thus an object of the present invention to provide a process for the production of propylene copolymers, in which propylene copolymer particles are obtained with improved properties.

In particular, the present invention has the objects of providing a process for the production of propylene copolymers having improved powder properties such as narrow composition distribution, narrow particle size distribution, reduced amount of fine polymer and increased apparent density of the resulting polymer powder.

A further object of the present invention is to improve the operability and control of the polypropylene production process. It is also an object of the invention to provide a process which allows an easy and flexible method of controlling of polymer properties, such as the amount of xylene soluble polymer.

The present invention is based on the finding that the above objects can be achieved if the copolymerisation of propylene monomers and further alpha-olefin monomers other than propylene is carried out in the presence of a catalyst which has been prepolymerised in the presence of propylene and a minor amount of alpha-olefin monomers other than propylene.

The present invention therefore provides a process for the production of propylene copolymers wherein
  in a first step an olefin polymerisation catalyst comprising a solid catalyst component is subjected to a prepolymerisation reaction in a prepolymerisation reactor, in which propylene monomers are present in an amount of 98.0 to 99.9 mol % and further alpha-olefin monomers other than propylene are present in an amount of 0.1 to 2.0 mol %, based on the combined amount of propylene and further alpha-olefin monomers, so that a prepolymer is produced on the catalyst in an amount of 10 to 1000 g per g of the solid catalyst component, and
  in a second, subsequent step propylene and further alpha-olefin monomers other than propylene are copolymerised in the presence of the prepolymerised catalyst produced in the first step so that a propylene copolymer is obtained which contains at least 0.1 mol % of alpha-olefin units other than propylene.

The feeding of a small amount of the other alpha-olefin into the prepolymerisation reactor in the process of the invention produces a number of unexpected advantages. Thus, it has surprisingly been found that a higher apparent density of the final polymer (bulk density) can be obtained. Further, a narrower composition distribution of the final polymer product, and hence a reduced amount of fine polymer particles, may be obtained. Also there is a lower risk of fouling of the reactor and the transfer pipes in the subsequent polymerisation stage.

The process of the invention allows the manufacture of copolymers with an increased content of alpha-olefin than the traditional prepolymerisation method. The process of the invention also makes it easier to control the properties of the final polymer, such as the amount of polymer soluble in cold xylene. Finally, the productivity can be increased both in the prepolymerisation reactor, leading to a higher amount of prepolymer on the catalyst, and in the subsequent polymerisation stage.

Preferably, in the process of the invention in the first step in the prepolymerisation reactor propylene monomers are present in an amount of 98.5 to 99.8 mol % and further alpha-olefin monomers other than propylene are present in an amount of 0.2 to 1.5 mol %, more preferably propylene monomers are present in an amount of 99.2 to 99.6 mol % and further alpha-olefin monomers other than propylene are present in an amount of 0.4 to 0.8 mol %.

All the molar percentages of the propylene and the further alpha-olefin monomers other than propylene given herein are based on the combined amount of propylene and further alpha-olefin monomers.

It is further preferred that in the process of the invention the prepolymerisation reaction is conducted continuously. The prepolymerisation may be conducted in any reactor known in the art, such as a continuous stirred tank reactor (CSTR), a loop reactor, or a comparted reactor such as disclosed in WO 97/33920 or WO 00/21656.

Preferably, the prepolymerisation is conducted in a liquid phase as a slurry polymerisation.

The solid catalyst and the prepolymer formed on the catalyst is suspended in the liquid phase.

In a preferred embodiment, the prepolymerisation is conducted as bulk slurry polymerisation in liquid propylene, i.e. the liquid phase mainly comprises propylene, with minor amount of other reactants and optionally inert components dissolved therein.

In the process of the invention, the prepolymerisation reaction is preferably conducted at a temperature of 0 to 50° C., more preferably from 10 to 45° C., and most preferably from 20 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The reaction conditions are well known in the art as disclosed, among others, in GB 1580635.

In the prepolymerisation step, the alpha-olefin other that propylene preferably has from 2 to 10 carbon atoms and more preferably is ethylene, 1-butene, 1-hexene, 1-octene or their mixture. Most preferably the other alpha-olefin is ethylene.

In average, the amount of prepolymer on the catalyst is from 10 to 1000 g per g of the solid catalyst component, more preferably is from 50 to 500 g per g of the solid catalyst component.

As the person skilled in the art knows, the catalyst particles recovered from a continuous prepolymerisation reactor do not all contain the same amount of prepolymer. Instead, each particle has its own characteristic amount which depends on the residence time of that particle in the prepolymerisation reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst is within the limits specified above. The amount of prepolymer is known in the art, among others, from GB 1580635.

The catalyst components are preferably all introduced to the prepolymerisation step. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or the walls of the reactor.

The catalyst used in the process of the invention may be any known particulate catalyst which is known to polymerise propylene. For example, it may be a Ziegler-Natta or a metallocene catalyst. Further, it may be supported on an inorganic oxide support, such as silica or alumina. It may also be supported on an organic polymer support, such as polystyrene, polyethylene or like. Further still, it may be supported on magnesium halide support, or it may be formed simultaneously with a magnesium halide support.

According to one embodiment of the invention, the polymerisation is conducted in the presence of a Ziegler-Natta catalyst. Such catalysts typically comprise a solid transition metal component which corresponds to the "solid catalyst component" mentioned herein, and a cocatalyst, i.e. the cocatalyst added is not included in the "solid catalyst component".

The solid transition metal component preferably comprises a magnesium halide and a transition metal compound. These compounds may be supported on a particulate support, such as inorganic oxide, like silica or alumina, or, usually, the magnesium halide itself may form the solid support. Examples of such catalysts are disclosed, among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754 and WO2004/029112.

In addition to the magnesium halide and transition metal compound the solid transition metal component usually also comprises an electron donor (internal electron donor). Suitable electron donors are, among others, esters of carboxylic acids, like phthalates, citraconates, and succinates. Also oxygen- or nitrogen-containing silicon compounds may be used. Examples of suitable compounds are shown in WO 92/19659, WO 92/19653, WO 92/19658, U.S. Pat. Nos. 4,347,160, 4,382,019, 4,435,550, 4,465,782, 4,473,660, 4,530,912 and 4,560,671.

Especially useful solid catalyst components are those disclosed in WO 20041029112. Thus, in an especially preferred embodiment of the present invention, the solid catalyst component is prepared by a process comprising: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one fourvalent Group 4 metal at a temperature greater than 10° C. and less than 60° C. to produce an emulsion of a denser, $TiCl_4$/toluene-insoluble, oil dispersed phase having, Group 4 metal/Mg mol ratio 0.1 to 10 in an oil disperse phase having Group 4 metal/Mg mol ratio 10 to 100; agitating the emulsion, optionally in the presence of an emulsion stabilizer and/or a turbulence minimizing agent, in order to maintain the is droplets of said dispersed phase within an average size range of 5 to 200 µm. The catalyst particles are obtained after solidifying said particles of the dispersed phase by heating. In said process an aluminium alkyl compound of the formula $AlR_{3-n}X_n$, where R is an alkyl group of 1 to 20, preferably of 1 to 10 carbon atoms, X is a halogen and n is 0, 1, 2 or 3, is added and brought into contact with the droplets of the dispersed phase of the agitated emulsion before recovering the solidified particles.

The cocatalyst used in combination with the solid transition metal component typically comprises an aluminium alkyl compound. The aluminium alkyl compound is preferably a trialkyl aluminium such as trimethylaluminium, triethylaluminium, tri-isobutylaluminium or tri-n-octylaluminium. However, it may also be an alkylaluminium halide, such as diethylaluminium chloride, diimethylaluminium chloride and ethylaluminium sesquichloride. It may also be an alumoxane, such as methylalumoxane (MAO), tetraisobutylalumoxane (TIBAO) or hexaisobutylalumoxane (HISAO).

Preferably the cocatalyst also comprises an electron donor. Suitable electron donors known in the art include ethers, ketones, amines, alcohols, phenols, phosphines and silanes. Examples of these compounds are given, among others, in WO 95/32994, U.S. Pat. Nos. 4,107,414, 4,186,107, 4,226, 963, 4,347,160, 4,382,019, 4,435,550, 4,465,782, 4,472,524, 4,473,660, 4,522,930, 4,530,912, 4,532,313, 4,560,671 and 4,657,882.

Electron donors consisting of organosilane compounds, containing Si—OCOR, Si—OR, or Si—$NR_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581,342, 4,657,882 and EP 45976 and EP 45977.

According to another embodiment of the invention, the catalyst is a metallocene catalyst. Such catalysts comprise a transition metal compound which contains a cyclopentadienyl, indenyl or fluorenyl ligand. Preferably the catalyst contains two bridged cyclopentadienyl, indenyl or fluorenyl ligands. Further, the ligands may have substituents, such as alkyl groups, aryl groups, arylalkyl groups, alkylaryl groups, silyl groups, siloxy groups, alkoxy groups and like. Examples of suitable metallocene compounds are given, among others, in EP 629631, EP 629632, WO 00/26266, WO 02/002576, WO 02/002575, WO 99/12943, WO 98/40331, EP 776913, EP 1074557 and WO 99/42497.

If a metallocene catalyst is used, the term "solid catalyst component" mentioned herein includes the metallocene component and the cocatalyst.

The catalyst may also be pretreated, such as prepolymerised so that it contains up to 5 grams of prepolymer per gram of solid catalyst component. For example, the catalyst may contain one or two grams of poly(vinylcyclohexane) per one gram of solid catalyst component. This allows the preparation of nucleated polypropylene as disclosed in EP 607703, EP 1028984, EP 1028985 and EP 1030878.

In the process of the invention the propylene copolymer produced in the second step preferably contains from 92 to 99.9 mol % propylene and from 0.1 to 8 mol % of an alpha-olefin other than propylene.

The polymerisation reaction in the second step of the process of the invention preferably is carried out at a temperature of from 60 to 100° C., more preferably from 60 to 90° C.

The polymerisation step may be conducted in any manner known in the art. For example, it may be conducted in slurry or in gas phase. In the polymerisation step polymerisation of propylene and another alpha-olefin is effected in the presence of the prepolymerised catalyst from the prepolymerisation step discussed above.

In the polymerisation step typically from 6,000 to 100,000 g propylene copolymer is formed per gram of solid catalyst component.

The polymer product from the polymerisation stage contains from 0.1 to 8% by mole of an alpha-olefin other than propylene and from 92 to 99.9% by mole of propylene. The alpha-olefin other that propylene preferably has from 2 to 10 carbon atoms and more preferably is ethylene, 1-butene, 1-hexene, 1-octene or their mixture. Most preferably the other alpha-olefin is ethylene.

The alpha-olefin comonomer other than propylene may be the same alpha-olefin as was used in the prepolymerisation step, or it may be different therefrom. Preferably, the same alpha-olefin comonomer is used in prepolymerisation and polymerisation steps.

The propylene copolymer further preferably has a melt index $MFR_2$ of from 0.1 to 500 g/10 min. The melt index of the polymer may be controlled in any manner known in the art. Preferably the melt index is controlled by adding hydrogen into the polymerisation step. As it is known, higher MFR is obtained by a higher amount of hydrogen. However, the actual amount of hydrogen needed for producing a given MFR depends on the catalyst system used, as well as other reaction conditions such as temperature and comonomer content.

The portion of polymer soluble in cold xylene (XS) may be controlled by the amount of comonomer on one hand and the catalyst composition, on the other hand. Preferably, the amount of xylene insoluble polymer at room temperature is form 92 to 98% and more preferably it is from 94 to 97%. A higher content of comonomer corresponds to a higher fraction of xylene soluble polymer. In addition, a higher isotacticity of the propylene polymer corresponds to a lower level of xylene soluble polymer.

If the polymerisation is conducted in liquid phase, the following conditions are preferably applied. The temperature in the polymerisation step is from 60 to 100° C., and more preferably from 65 to 95° C. Especially the temperature should be selected for obtaining a high productivity of the catalyst on one hand and minimising the solubility of the polymer into the reaction mixture, on the other hand.

The pressure is not critical but must be sufficiently high to maintain the reaction mixture in liquid phase. Thus, the pressure may be from 20 to 100 bar, for example 30 to 70 bar.

If the polymerisation is conducted in gas phase, the following conditions are preferably applied. The temperature in the polymerisation step is from 60 to 100° C. and preferably from 65 to 95° C. Especially the temperature should be selected for obtaining a high productivity of the catalyst on one hand and minimising the softening of the polymer particles to prevent them from forming agglomerates, on the other hand.

The pressure is not critical. Suitable pressure may be from 5 to 50 bar, for example 10 to 30 bar.

The polymerisation may also be conducted in two or more cascaded reactors, like disclosed in WO 98/58975, WO 98/58976 and WO 98/58977.

The present invention furthermore relates to a propylene copolymer obtainable by a process in any of the embodiments described hereinbefore.

Still further, the invention relates to the use of a prepolymerised catalyst which has been produced in a process including subjecting an olefin polymerisation catalyst to a prepolymerisation reaction in a prepolymerisation reactor, in which propylene monomers are present in an amount of 95.0 to 99.9 mol % and further alpha-olefin monomers other than propylene are present in an amount of 0.1 to 5.0 mol %, based on the combined amount of propylene and further alpha-olefin monomers, so that a prepolymer is produced on the catalyst in an amount of 10 to 1000 g per g of catalyst, or has been produced in a process in any of the embodiments for producing the prepolymerised catalyst as described hereinbefore, for the production of a propylene copolymer which contains at least 0.1 mol % of alpha-olefin units other than propylene.

By operating the prepolymerisation reactor according to the invention it is thus possible to improve the stability of the overall polymerization process and to produce polymer particles having a higher bulk density and a smaller amount of fines than by prior art processes with no comonomer feed into the prepolymerisation reactor. Moreover, too high comonomer feed into the prepolymerisation step has negative effect on polymer morphology. Bulk density starts then to suffer and the amount of fines becomes higher.

EXAMPLES

1. Definitions and Measurement Methods a) Melt flow rate (MFR) of the polymer was measured according to ISO 1133 at a temperature of 230° C. The load is indicated as a subscript, i.e. $MFR_2$ is measured under a load of 2.16 kg.

b) Xylene solubles

Determination of xylene soluble fraction (XS): 2.0 g of polymer is dissolved in 250 ml p-xylene at 135° C. under agitation. After 30 minutes the solution is allowed to cool for 15 minutes at ambient temperature and then allowed to settle for 30 minutes at 25° C. The solution is filtered with filter paper into two 100 ml flasks.

The solution from the first 100 ml vessel is evaporated in nitrogen flow and the residue is dried under vacuum at 90° C. until constant weight is reached.

XS %=(100·m·Vo)/(mo·v); mo=initial polymer amount (g); m=weight of residue (g); Vo=initial volume (ml); v=volume of analysed sample (ml).

Amorphous rubber fraction of the xylene solubles (AM)

Determination of AM: The solution from the second 100 ml flask in the xylene solubles analysis is treated with 200 ml of acetone under vigorous stirring. The precipitate is filtered and dried in a vacuumoven at 90° C.

c) Bulk density

The bulk density of the polymer powder was determined according to ASTM D1895-96, method A.

d) Average particle size

Average particle size was determined by sieving the polymer powder according to ASTM D1921-06. The screen set consisted of screens having openings of 4.000 mm, 2.000 mm, 0.850 mm, 0.355 mm, 0.250 mm and 0.106 mm e) Fines The fines were determined by sieving the polymer powder according to ASTM D1921-06. The powder passing the 0.250 mm screen was considered as fines.

f) Activity of the catalyst

The activity of the catalyst was calculated as $$\text{Act} = \frac{P^2 \cdot (\rho_p - \rho_l)}{m_c \cdot V_R \cdot \rho_p \cdot (\rho_s - \rho_l)},$$

where P is the production rate of polyprpolylene within the slurry reactor, $\rho_p$ is the density of the polypropylene, $\rho_l$ is the density of the liquid (or fluid) phase within the slurry reactor, $\rho_s$ is the density of the polymer slurry within the slurry reactor, $V_R$ is the volume of the slurry reactor, $m_c$ is the feed rate of the catalyst and Act is the activity of the catalyst within the slurry polymerisation.

g) Determination of Comonomer Content

The comonomer content was determined by $^{13}$C NMR. The $^{13}$C NMR spectra of polypropylenes were recorded on Bruker 400 MHz spectrometer at 130° C. from samples dissolved in 1,2,4-trichlorobenzene/benzene-d6 (90/10 w/w).

2. Production of Polymers

Example 1 a) Catalyst Preparation

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried.

b) Prepolymerisation with Vinycyclohexane

The solid catalyst component was suspended in Drakeol 35 oil, supplied by Penreco, to produce a catalyst slurry containing 22.6% by weight solids.

Triethylaluminiun and dicyclopentyldimethoxysilane (DCPDMS) were then added to the slurry so that the molar ratio Al/Ti was 1.4 mol/mol and the molar ratio of triethylaluminium to DCPDMS was 7 mol/mol. Then, vinylcyclohexane was added to the slurry in such an amount that the weight ratio of the vinylcyclohexane to the solid catalyst component was 1/1. The mixture was agitated and allowed to react until the content of the unreacted vinylcyclohexane in the reaction mixture was about 1000 ppm. The thus prepolymerised catalyst was then filtered and mixed with fresh Drakeol 35 to reach a catalyst concentration of 22 wt. %, calculated as solid transition metal to component in oil.

c) Prepolymerisation

Into a continuous stirred tank vessel having a volume of 15 dm$^3$ were fed 35 kg/h of liquid propylene, 0.10 kg/h of ethylene and 1.22 g/h of hydrogen. In addition, 0.61 g/h of the solid vinylcycloxane-prepolymerised polymerisation catalyst prepared according to a) and b) above was added.

Together with the above-mentioned solid component, a cocatalyst containing triethylaluminium as an activator and dicyclopentyldimethoxysilane as an electron donor was used so that the molar ratio of the activator to titanium was 450 and the molar ratio of the activator to the electron donor was 8. The temperature in the tank was 31° C. and the pressure was 55 bar. The ethylene content in the liquid phase was thus 0.5% by mole.

d) Slurry polymerisation

The slurry withdrawn from the prepolymerisation step above was directed into a slurry polymerisation step conducted in a loop reactor having a volume of 150 dm$^3$ at a temperature of 72° C. and a pressure of 54 bar. In addition, 158 kg/h of propylene, 1.9 kg/h of ethylene and 14.4 g/h of hydrogen were introduced into the reactor. The production rate of the propylene copolymer was 27.4 kg/h.

The MFR$_2$ of the propylene copolymer thus obtained was 1.7 g/10 min, the fraction of xylene soluble polymer was 8.6% and the ethylene content was 3.7% by mole. The bulk density was 343 kg/m$^3$, the average particle size 2 mm and the fraction of fines was 1.9%.

Example 2

The procedure of example 1 was repeated except that the ethylene content in the liquid phase of the prepolymeriser was 0.9% by mole. The data are shown in Table 1.

Example 3

The procedure of example 1 was repeated except that the ethylene content in the liquid phase of the prepolymeriser was 1.8% by mole. The data are shown in Table 1.

Comparative Example 1

The procedure of example 1 was repeated except that no ethylene was fed into the prepolymerisation reactor. The data are shown in Table 1.

Example 4

The procedure of example 1 was repeated except that the ethylene content in the liquid phase of the prepolymeriser was 1.7% by mole and the polymerisation conditions in the loop reactor were modified so that the ethylene content in the final product was 2.3% by mole. Further, the molar ratio of aluminium of the cocatalyst to the titanium in the solid catalyst component was 300 and the molar ratio of DCPMS to aluminium was 8.4. The data are shown in Table 1.

Comparative Example 2

The procedure of Example 4 was repeated except that the conditions were changed as shown in Table 1.

Example 5 a) Prepolymerisation

Into a continuous stirred tank vessel having a volume of 50 dm$^3$ were fed 65 kg/h of liquid propylene, 0.30 kg/h of ethylene and 3.0 g/h of hydrogen. In addition, 2.4 g/h of a solid polymerisation catalyst was introduced into the vessel. The solid catalyst component was prepared otherwise according to Example 8 of WO 2004/029112, except that diethylaluminium chloride was used as an aluminium compound instead of triethylaluminium.

Together with the abovementioned solid component, a cocatalyst containing triethylaluminium as an activator and dicyclopentyldimethoxysilane as an electron donor was used so that the molar ratio of the activator to titanium was 450 and the molar ratio of the activator to the electron donor was 10. The temperature in the tank was 30° C. and the pressure was 55 bar. The ethylene content in the liquid phase was thus 0.7% by mole.

bar and ethylene feed to the loop reactor was 1.15 kg/h. The $MFR_2$ of the propylene copolymer thus obtained was 4 g/10 min, the fraction of xylene soluble polymer was 5.2% and the ethylene content was 3.7 mol-%. The bulk density was 439 kg/m$^3$, the average particle size 1.38 mm and the fraction of fines was 0%. The data is shown in Table 1.

TABLE 1

Polymerisation data

| Example | Catalyst | Prepol temp. °C. | Prepol ethylene Mol % | Amount Pre-polymer* | Loop temp. °C. | Prod. Kg/h | Bulk density Kg/m3 | Ethylene content Mol-% | MFR g/10 min | Fines % |
|---|---|---|---|---|---|---|---|---|---|---|
| 1 | A | 31 | 0.5 | 240 | 72 | 27 | 343 | 5.4 | 1.7 | 1.9 |
| 2 | A | 31 | 0.9 | 225 | 72 | 26 | 356 | 5.9 | 1.8 | 1.9 |
| 3 | A | 31 | 1.8 | 235 | 72 | 25 | 371 | 4.9 | 2.0 | 1.9 |
| CE1 | A | 31 | 0 | 235 | 72 | 28 | 315 | 5.7 | 1.6 | 2.5 |
| 4 | B | 30 | 1.7 | 190 | 80 | 29 | 370 | 3.4 | 1.4 | 1.0 |
| CE2 | B | 30 | 0 | 215 | 80 | 31 | 350 | 2.2 | 1.5 | 2.0 |
| 5 | E | 30 | 0.7 | 60 | 70 | 29 | 393 | 5.7 | 4.7 | 2.2 |
| 6 | E | 30 | 0.7 | 60 | 70 | 30 | 407 | 5.8 | 5.5 | 1.5 |
| CE3 | E | 30 | 0 | 60 | 70 | 27 | 371 | 5.6 | 4.1 | 6.7 |
| 7 | E | 35 | 0.7 | 60 | 70 | 27 | 439 | 3.7 | 4.0 | 0 |

*measured in g per g of solid catalyst component b) Slurry polymerisation

The slurry withdrawn from the prepolymerisation step above was directed into a slurry polymerisation step conducted in a loop reactor having a volume of 150 dm$^3$ at a temperature of 70° C. and a pressure of 55 bar. In addition, 160 kg/h of propylene, 1.9 kg/h of ethylene and 10 g/h of hydrogen were introduced into the reactor. The production rate of the propylene copolymer was 29 kg/h.

The $MFR_2$ of the propylene copolymer thus obtained was 4.7 g/10 min, the fraction of xylene soluble polymer was 10.7% and the ethylene content was 5.7% by mole. The bulk density was 343 kg/m$^3$, the average particle size 2 mm and the fraction of fines was 1.9%.

Example 6

The procedure of Example 5 was repeated. The MFR, of the propylene copolymer thus obtained was 5.5 g/10 min, the fraction of xylene soluble polymer was 10.7% and the ethylene content was 5.8 mol-%. The bulk density was 407 kg/m$^3$, the average particle size 1.42 mm and the fraction of fines was 1.5%. The results are shown in Table 1.

Comparative Example 3

The procedure of Example 5 was repeated except no ethylene was introduced into the prepolymerisation reactor. The $MFR_2$ of the propylene copolymer thus obtained was 4.1 g/10 min, the fraction of xylene soluble polymer was 9.8% and the ethylene content was 5.6 mol-%. The bulk density was 373 kg/m$^3$, the average particle size 1.1 mm and the fraction of fines was 6.7%. Signs of the reactor fouling was observed. The heat transfer coefficient of the Loop reactor went slowly down during the course of the operation. The results are shown in Table 1.

Example 7

The procedure of Example 5 was repeated except that the temperature in the prepolymerisation reactor was 35° C., the pressure in the prepolymerisation and loop reactors was 46

The results show that small (0.5 to 1.8 mol-%) C2 feed to the prepolymerisation reactor improves the morphology of the formed polymer particles. Bulk density is higher and fines content is lower. And operability of the process is better.

Example 8 a) Prepolymerisation.

Into a continuous stirred tank vessel having a volume of 15 dm$^3$ were fed 35 kg/h of liquid propylene, 0.28 kg/h of ethylene and 1.75 g/h of hydrogen. In addition, 1.8 g/h of the solid catalyst component prepared according to procedure a) as described in Example I was introduced into the vessel.

Together with the abovementioned solid component, a cocatalyst containing triethylaluminium as an activator and dicyclopentyldimethoxysilane as an electron donor was used so that the molar ratio of the activator to titanium was 200 and the molar ratio of the activator to the electron donor was 10. The temperature in the tank was 30° C. and the pressure was 55 bar. The ethylene content in the liquid phase was thus 1.3% by mole.

b) Slurry polymerisation

The slurry withdrawn from the prepolymerisation step above was directed into a slurry polymerisation step conducted in a loop reactor having a volume of 150 dm$^3$ at a temperature of 80° C. and a pressure of 54 bar. In addition, 169 kg/h of propylene, 0.2 kg/h of ethylene and 28 g/h of hydrogen were introduced into the reactor. The production rate of the propylene copolymer was 31 kg/h.

The $MFR_2$ of the propylene copolymer thus obtained was 6.3 g/10 min, the fraction of xylene soluble polymer was 2.2% and the ethylene content was 0.6% by mole. The bulk density was 376 kg/m$^3$. The activity of the catalyst in the slurry polymerisation stage was 32.4 kg PP/g catalyst/h. The polymerisation data is shown in Table 2.

Comparative Example 4

The procedure of Example 8 was repeated except that no ethylene was introduced into the prepolymerisation reactor and the catalyst feed rate was 2.3 g/h. The polymerisation data is shown in Table 2.

TABLE 2

| | | Prepol | Prepol y. | Loop | | Bulk | Ethylene | | |
| | Cata- | temp. | ethylene | temp. | Prod. | density | content | MFR$_2$ | Activity |
| Example | lyst | °C. | Mol-% | °C. | Kg/h | kg/m3 | Mol-% | g/10 min | kg/g/h |
|---|---|---|---|---|---|---|---|---|---|
| 8 | C | 30 | 0.5 | 80 | 31 | 376 | 0.6 | 6.3 | 32 |
| CE4 | C | 30 | 0 | 80 | 33 | 341 | 0.7 | 5.5 | 26 |

Polymerisation data of Example 8 and Comparative Example 4

The data shows that by feeding ethylene into the prepolymerisation reactor a higher activity of the catalyst in the subsequent polymerisation stage could be obtained.

The invention claimed is:

1. A process for the production of propylene copolymers wherein
in a first step, an olefin polymerisation catalyst comprising a solid catalyst component is subjected to a prepolymerisation reaction in a prepolymerisation reactor, in which propylene monomers are present in an amount of 98.5 to 99.8 mol % and further alpha-olefin monomers other than propylene are present in an amount of 0.2 to 1.5 mol %, based on the combined amount of propylene and further alpha-olefin monomers, so that a prepolymer is produced on the catalyst in an amount of 10 to 1000 g per g of the solid catalyst component, and
in a second, subsequent step, propylene and further alpha-olefin monomers other than propylene are copolymerised in the presence of the prepolymerised catalyst produced in the first step so that a propylene copolymer is obtained-which contains at least 0.1 mol % of alpha-olefin units other than propylene.

2. The process according to claim 1, wherein in the first step in the prepolymerisation reactor propylene monomers are present in an amount of more than 99.2 to 99.6 mol % and further alpha-olefin monomers other than propylene are present in an amount of 0.4 to 0.8 mol %, based on the combined amount of propylene and further alpha-olefin monomers.

3. The process according to claim 1, wherein the prepolymerisation reaction is conducted continuously.

4. The process according to claim 1, wherein the prepolymerisation reaction is conducted in liquid phase.

5. The process according to claim 1, wherein the prepolymerisation reaction is conducted at a temperature of 0 to 50 ° C.

6. The process according to according to claim 1, wherein the propylene copolymer produced in the second step contains from 92 to 99.9 mol % propylene and from 0.1 to 8 mol % of an alpha-olefin other than propylene.

7. The process according to claim 1, wherein the propylene copolymer produced in the second step has an amount of xylene insolubles of 92 to 98 wt %.

8. The process according to claim 1, wherein the propylene copolymer produced in the second step has a MFR$_2$ (230 ° C,2.16 kg) of 0.1 to 500 g/10min.

9. The process according to claim 1, wherein the alpha-olefin monomers other than propylene in the first and in the second step independently are selected from the group of alpha-olefins having from 2 to 10 carbon atoms.

* * * * *